United States Patent [19]
Uda et al.

[11] Patent Number: 5,452,156
[45] Date of Patent: Sep. 19, 1995

[54] SPINDLE MOTOR WITH COMBINED PRESSURE RELIEF AND ADHESIVE CARRYING ANNULAR RECESSES

[75] Inventors: Takeshi Uda, Naka; Shinichi Iwagaki, Tottori, both of Japan

[73] Assignee: Nippon Densan Corporation, Kyoto, Japan

[21] Appl. No.: 200,998

[22] Filed: Feb. 24, 1994

Related U.S. Application Data

[62] Division of Ser. No. 954,384, Sep. 30, 1992, abandoned.

[30] Foreign Application Priority Data

| Oct. 1, 1991 | [JP] | Japan | ................................. 3-282166 |
| Oct. 30, 1991 | [JP] | Japan | ................................. 3-190867 |
| Nov. 27, 1991 | [JP] | Japan | ................................. 3-198549 |

[51] Int. Cl.⁶ .......................................... G11B 17/08
[52] U.S. Cl. ............................. 360/97.01; 360/98.07; 360/99.08
[58] Field of Search ............... 360/98.07, 99.04, 99.08, 360/97.01, 98.01

[56] References Cited

U.S. PATENT DOCUMENTS

| 5,295,029 | 3/1994 | Elsing et al. | ..................... 360/98.07 |
| 5,305,163 | 4/1994 | Holm | ............................ 360/98.07 |

*Primary Examiner*—A. J. Heinz
*Attorney, Agent, or Firm*—McCormick, Paulding & Huber

[57] ABSTRACT

A spindle motor, a hub member for carrying a recording disk(s) thereon, a shaft member fixedly mounted to the hub member, and a bracket member rotatably supporting the shaft member. A pair of bearings each have inner and outer races fixed respectively to the bracket member and the hub member. First and second annular recesses relieve pressure on the bearings and also carry adhesive fixing the beatings in position.

5 Claims, 5 Drawing Sheets

SPINDLE MOTOR WITH COMBINED PRESSURE RELIEF AND ADHESIVE CARRYING ANNULAR RECESSES

This is a divisional application Ser. No. 07/954,384 filed on Sep. 30, 1992 now abandoned.

FIELD OF THE INVENTION

The present invention relates to a spindle motor for use in e.g. an optical or magnetic disk drive apparatus and more particularly, a recording medium drive apparatus for rotating a recording medium(s) such as a hard disk precisely with no unfavorable movement while holding it at a stationary position.

DESCRIPTION OF THE INVENTION

A variety of spindle motors are used for driving disks of different type. In particular, some of the up-to-date disk drive apparatuses are fabricated in precision and still remain portable. Hence, spindle motors to be mounted in such portable disk drive apparatuses should be compact in size and capable of driving disks at high accuracy and steadiness while keeping the interior of the disk drive apparatus clean and unfouled.

One such compact spindle motor is disclosed in U.S. Pat. No. 4,965,476.

Disclosed in U.S. Pat. No. 5,138,209 is another spindle motor designed for driving a disk without any unfavorable movement.

The compact spindle motor depicted in U.S. Pat. No. 4,965,476 has a stator supported by a flange and bearings supported by a hub. The flange and the hub involve in combination a considerable extension of thickness, thus limiting the overall compactness of the motor. Also, the spindle motor described in U.S. Pat. No. 5,138,209 is adapted in which unfavorable movement in rotation is minimized by means of improved installation of an outer sleeve to the shaft member. However, no holding means for sustaining the disk which tends to generate an unfavorable movement during the rotation is provided in the spindle motor.

Also, a known disk drive apparatus is shown in FIG. 11.

FIG. 11 is a cross sectional view of the magnetic disk drive apparatus for rotation of e.g. a magnetic recording disk, illustrating the left half of a drive section of the same. As shown, a stationary member or bracket (e) has a cylinder portion (k) provided coaxially thereof. A pair of bearings (f) and (g) are mounted to the inner side of the cylinder portion (k). A shaft member (i) is rotatably supported by the two bearings (f) and (g). The shaft member (i) has an axially extending bore (j) provided in the uppermost end thereof. A hub (b) of approximately circular shape is fitted onto the shaft member (i) for holding a magnetic disk (a) on the upper surface thereof.

More particularly, the recording disk (a) is loaded on to the hub (b) using a known center-clamping method. In process, the magnetic disk (a) is placed on the upper surface of the hub (b) and clamped with a clamp (c) of circular shape which is tightened to the shaft member (i) by threading a screw (d) into the center bore (j). This allows the magnetic disk (a) to be held down to the hub (b), as shown in FIG. 11.

Latest portable note-book type microcomputers which are commercially available are provided with built-in type magnetic disk drives. Those microcomputers are also required to reduce their overall size to a minimum. For the purpose, it is essential to have such built-in type magnetic disk drive apparatuses arranged as small as possible in the thickness or height (i.e. to decrease the height of h2 shown in FIG. 11). The foregoing arrangement of the known recording disk drive apparatus is however limitative in reduction of the height as its bearings (f) and (g) and their components are hardly reduced in the size without sacrificing the rigidity and the performance.

Also, the clamp (c) of the known recording disk drive apparatus remains tightened with the screw (d) to the rotor hub (b), thus being stressed about the center screw hole thereof. As the clamp (c) is pressed down at the center region, its radially outward end will be deflected up from the rotor hub (b). More specifically, the lowermost of the rim end of the clamp (c) which is to hold down the disk (a) is deflected upward so that the disk (a) can remain held loosely with a less pressure.

In a common spindle motor for rotation of a disk, the bearings are fixedly mounted at their inner and outer races to the corresponding locations of both a stationary member and a rotating member. Also, the inner or outer race is designed to remain tensioned in one direction. This causes the stationary and rotating members to be stressed. Thus, a counter stress is applied to the inner or outer race of the bearing at a right angle to the tensioning direction, causing a distortion or deformity. As the result, the rotating accuracy will be impaired. If any outside force is exerted onto the stationary or rotating member, the inner or outer race becomes stressed crosswise and thus, the tensioning strength on the bearings will be affected. Accordingly, a high accuracy in the rotation will hardly be ensured.

The present invention is directed towards eliminating the foregoing drawbacks of the prior art. It is thus an object of the present invention to provide an improved recording disk drive apparatus arranged minimized in the thickness or height without impairing the driving power, rigidity, and substantial characteristics. It is another object of the present invention to provide a recording medium drive apparatus capable of holding a recording medium securely, in which the deflecting angle of a clamp resulting from clamping at center is minimized so that the holding force of the clamp to the recording medium can successfully be maintained.

It is a further object of the present invention to provide a spindle motor in which counter stress resulting from the tensioning of the inner and outer races of each bearing is not concentrated about the tensioning direction but dissipated rationally so that an accurate and constant rotating motion can be ensured.

DETAILED DESCRIPTION OF THE PREFERRED EMBODIMENTS

Figures 1, 2:
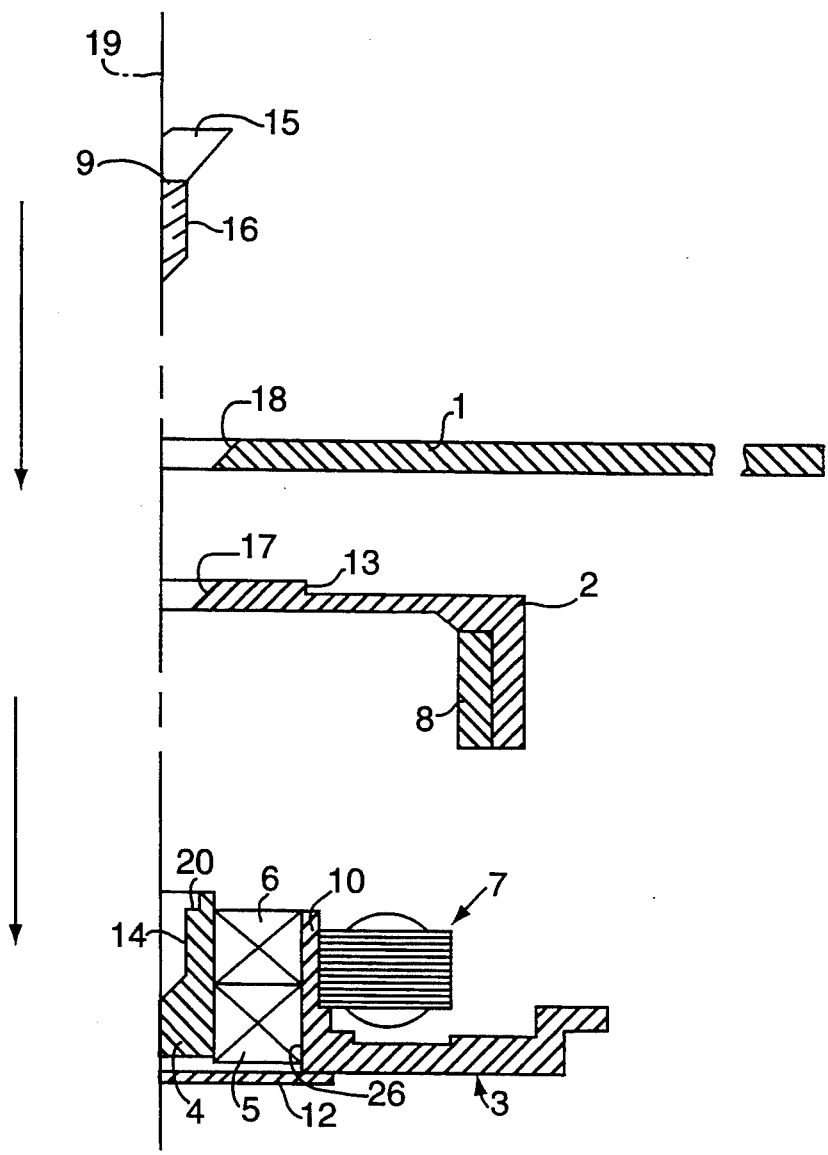
FIG. 1 is a cross sectional view of a recording disk drive apparatus showing a first embodiment of the present invention.
FIG. 2 is a cross sectional view explaining a procedure of assembling the recording medium drive apparatus illustrated in FIG. 1.
Figure 11:
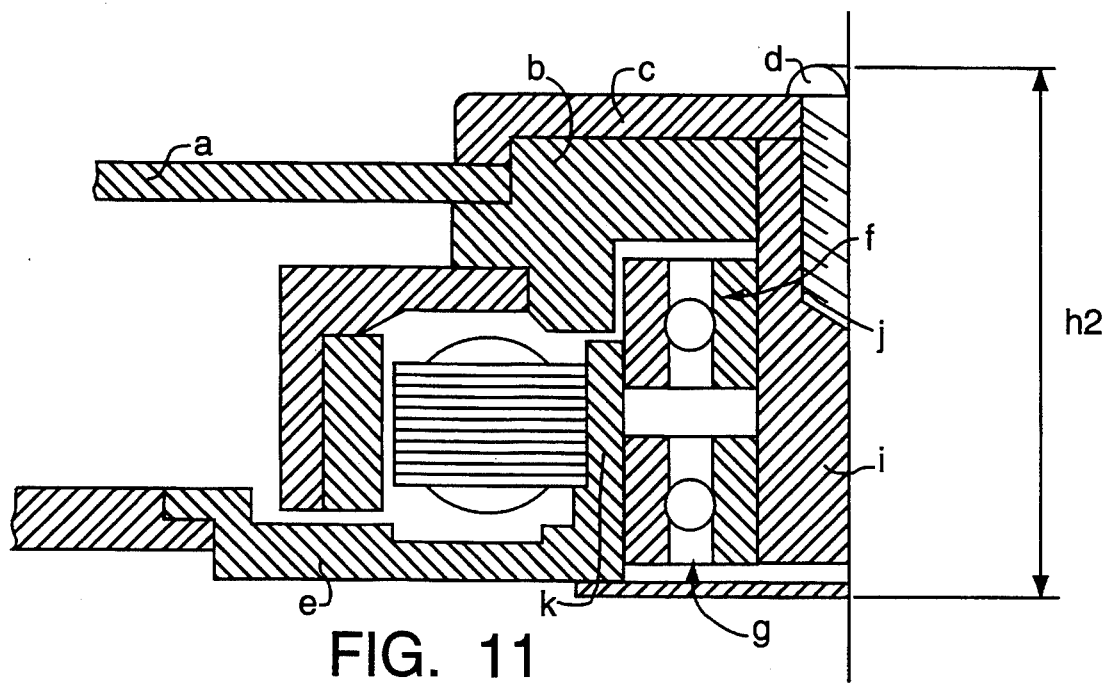
FIG. 11 is a cross sectional view showing a known recording disk drive apparatus.

Recording disk drive apparatuses according to the present invention will be described referring to FIGS. 1 to 4. Generally speaking, those recording disk drive apparatuses are other forms of the drive apparatus shown in FIG. 11. FIG. 1 is a cross sectional view showing the right half of one such recording disk drive apparatus (which can carry one magnetic disk therein) referred to as a first embodiment of the present invention. As shown, a stationary member or bracket 3 is formed of a dish shape of an aluminum material and has at center a center cylinder 10 arranged integral therewith and extending coaxially of a rotating axis 19. The bracket 3 is fixedly mounted at its rim end 51 to a base 11 of the recording disk drive apparatus.

A couple of bearings or namely, ball bearings 5 and 6 are mounted to the inner side 26 of the center cylinder 10 of the bracket 3. More specifically, the outer races of the two ball bearings 5,6 are bonded by an adhesive to the inner side 26 of the cylinder 10. A shaft member 4 is mounted by the two ball bearings 5,6 to the center cylinder 10 of the bracket 3 (as engaging with the inner races of the two bearings 5,6). Accordingly, the shaft member 4 can rotate about the rotating axis 19 as supported with the center cylinder 10 and the bracket 3. In common, the two ball bearings 5,6 are urged by a given pressure in the direction of the rotating axis while being installed at predetermined positions between the outer side 25 of the shaft member 4 and the inner side 26 of the center cylinder 10 during the assembly procedure.

An armature 7 of an annular shape which comprises a ferrous core having holding slots and armature coils is fitted onto the outer side 50 of the center cylinder 10. A lead cable from the armature 7 is provided to extend through a hole, not shown, arranged in the bracket 3 to the outside of the drive apparatus.

The shaft member 4 has a center bore 14 provided in the upper end thereof and extending coaxially of the rotating axis 19. The uppermost of the bore 14 is radially enlarged thus forming an annular recess 20. A screw 9 is threaded into the bore 14 for tightening both a magnetic disk 1 and a hub 2 to the shaft member 4.

The hub 2 has a pan-like shape formed of e.g. a stainless steel material which exhibits magnetism. The hub 2 has a center opening 17 provided in the center thereof about the rotating axis 19. Also, a rotor magnet 8 of an annular shape is mounted to the inner side of a rim wall of the hub 2 by bonding so that it can face the armature 7. The hub 2 has a raised portion 13 provided on the upper side 28 thereof for serving as a spacer (distance piece) between the hub 2 and the magnetic disk 1 which is placed on the hub 2.

A center opening 18 of the magnetic disk 1 like the center opening 17 of the hub 2 is provided about the rotating axis 19. The diameter of each opening 17 or 18 is arranged to vary from the upper to the lower. More particularly, either of the openings 17 and 18 becomes smaller towards the lower end as having a taper shape. The taper of the center openings 17 and 18 corresponds to the shape of a tapered head 15 of the screw 9. The center openings 17 and 18 may be formed not in a taper shape but in a straight hole along the rotating axis 19. However, the taper shaped openings 17, 18 ensure easy adjustment for alignment.

The screw 9 is formed of e.g. a non-magnetic stainless steel and consisted of the tapered head 15 and a thread stud 16 (male) threaded at give pitches. The tightening of the magnetic disk 1 and the hub 2 to the shaft member 4 with the screw 9 will be explained in more detail referring to FIG. 2.

FIG. 2 is a cross sectional view showing a procedure of assembling the magnetic disk drive apparatus of the first embodiment illustrated in FIG. 1. As apparent from FIGS. 1 and 2, the armature 7 is first fitted onto the outer side 50 of the center cylinder 10 of the bracket 3 and the two ball bearings 5,6 are mounted at their outer races to the inner side 26 of the center cylinder 10 where an amount of adhesive has been applied. The shaft member 4 of which outer side 25 has been coated with the adhesive is then inserted into the inner races of the two ball bearings 5,6 for installation. Before the adhesive is cured, the inner race of the lower ball bearing 5 is pressed upward of FIG. 2 in the direction of the rotating axis 19 by an urging means not shown thus to produce tension on the two bearings 5,6.

In this manner, the shaft member 4 is installed to the bracket 3 for rotation. Then, the hub 2 and the magnetic disk 1 are placed on the shaft member 4 and the screw 9 is threaded through the center openings 17,18 of the hub 2 and the magnetic disk 1 into the center bore 14 of the shaft member 4, as denoted by the arrows of FIG. 2. In an early stage of the screwing, the magnetic disk 1 and the hub 2 are loosely held with the screw 9 to the shaft member 4 (in a not-aligned state) as the thread stud 16 of the screw 9 is smaller in the diameter than the openings 17,18. According to the first embodiment, the center bore 14 in the shaft member 4 is not female threaded. The screw 9 can cut a female thread with its thread stud 16, i.e. tapping, as it advances into the bore 14. The center bore 14 may be provided with a corresponding thread.

As the screw 9 further moves into the bore 14 in the direction denoted by the arrow of FIG. 2, its tapered head 15 comes in direct contact with the tapered surfaces of the openings 17,18 of the hub 2 and the magnetic disk 1. In particular, both the magnetic disk 1 and the hub 2 loosely seated on the shaft member 4 are displaced radially by the action of the tapered head 15 of the screw 9 and become aligned when their respective openings 18 and 17 engage directly with the tapered head 15. The magnetic disk 1 and the hub 2 are aligned and secured in coupling to the shaft member 4 by the screwing of the screw 9. The annular recess 20 at the upper end of the center bore 14 is designed to accept the tapered side of the screw head 15 so that the screw 9 can move into the bore 14 with ease, The screw 9 in the first embodiment is adapted for alignment of the magnetic disk 1 and the hub 2 with its tapered head 15 and for fastening down the same with its thread stud 16. Using the screw 9, the magnetic disk 1 and the hub 2 can be assembled with much ease and also, aligned and fastened at one time. As the screw 9 serves as a pressing means (clamp) and a fastening means (screw) for the magnetic disk, the number of overall components becomes less and the height h1 of the drive apparatus shown in FIG. 1 is decreased. As the result, the magnetic disk drive apparatus will be reduced in the height or thickness.

As shown in FIG. 1, the magnetic disk 1 and the hub 2 are rotatably supported in coupling by the shaft member 4 after the assembling. In action, the magnetic disk 1 is rotated relative to the bracket 3 by the electromagnetic action between the armature 7 and the rotor magnet 8. There is provided a seal member 12 for prevention of the escape or leakage of a lubricant, e.g. grease, filled in the ball bearings 5,6 from the drive apparatus. Also, the entrance of unclean air including drops of grease into a disk chamber 27 will be prevented by a labyrinth sealing arrangement constituted by an end side 23 of the hub 2, a side surface 24 of the rotor magnet 8, and a bottom surface 21 and a side surface 22 of the bracket 3.

Figure 3:
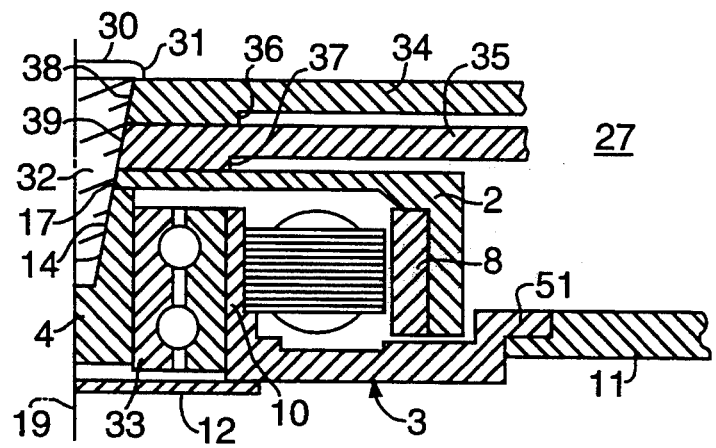
FIG. 3 is a cross sectional view of another recording disk drive apparatus showing a second embodiment of the present invention.

FIG. 3 is a cross sectional view of another recording disk drive apparatus showing a second embodiment of the present invention. Like components as in FIGS. 1 and 2 are denoted by like numbers for ease of description. Also, the explanation of similar components and their functions will not be repeated. The magnetic disk drive apparatus of the second embodiment contains two magnetic disks 34,35 loaded on a hub 2. The two magnetic disks 34,35 are arranged in two, upper and lower, layers and have raised portions 36 and 37 respectively which are to serve as spacers (distance pieces) inbetween (cf. the hub 2 has at top the raised portion 13 in the first embodiment).

The two magnetic disks 34,35 are mounted about a rotating axis 19 and have taper-shaped openings 38,39 provided in their respective centers thereof. The taper shape of the center openings 38,39 corresponds to the tapered thread portion of a screw 30 which is threaded into a shaft member 4. The screw 30 in the second embodiment comprises a half-round head 31 and a (male) thread 32 which is tapered off. Accordingly, when the screw 30 is threaded into the center bore 14 of the shaft member 4, the two openings 38,39 and a center opening 17 of the hub 2 become aligned with its thread 32 and the two magnetic disks 34,35 and the hub 2 are tightened together to the shaft member 4. The center bore 14 of the shaft member 4 in the second embodiment is provided with a female thread corresponding to the tapered thread 32 of the screw 30.

As shown in FIG. 3, the screw 30 is adapted for alignment of the two magnetic disks 34,35 and the hub 2 with its tapered thread 32 and for pressing down the same against the shaft member 4. The lower side of the head 31 of the screw 30 may also be tapered as well as the (male) thread 32. According to the second embodiment, the drive apparatus can be minimized in the overall height or thickness even when the multi-layer arrangement of magnetic disks or bulk storage system is employed. As apparent from FIG. 3, a unit bearing 33 is applied for smooth rotation, contributing to the component reduction and the small size of the magnetic disk drive apparatus. The other primary components are similar to those of the first embodiment and will no more be explained.

Figure 4:
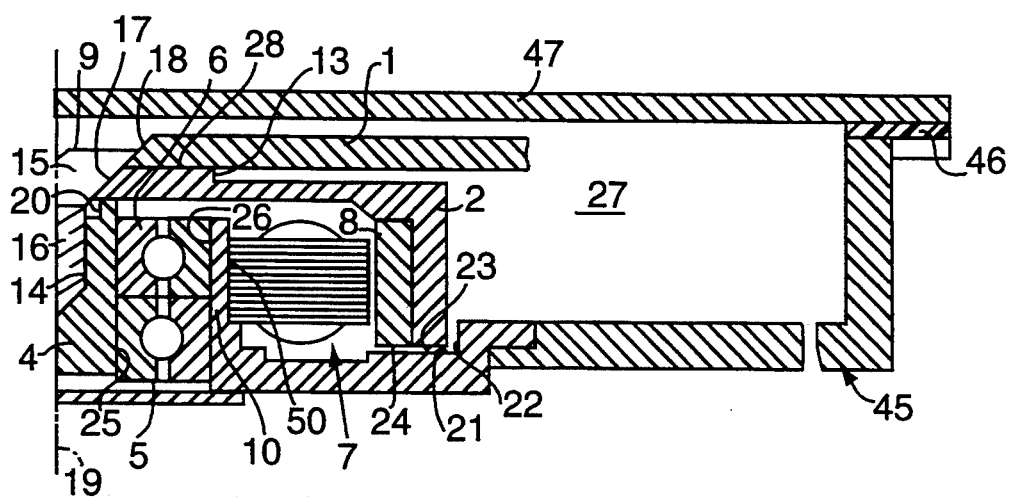
FIG. 4 is a cross sectional view of a further recording disk drive apparatus showing a third embodiment of the present invention.

FIG. 4 is a cross sectional view of a further recording disk drive apparatus showing a third embodiment of the present invention. The recording disk drive apparatus of the third embodiment is similar to that of the first embodiment illustrated in FIG. 1 and like components are denoted by like numbers as of the first embodiment. The third embodiment is however distinguished by the fact that the bracket 3 and the base 11 of the first embodiment as stationary members are replaced with a base housing 45. The base housing 45 forms with a top cover 47 a disk chamber 27 therein, thus contributing to the component reduction of the drive apparatus.

The base housing 45 is formed of e.g. a zinc material. Also, a seal member 46 of resilient material is interposed between the top cover 47 and the base housing 45 for air-tightening of the disk chamber 27.

Although each of the foregoing embodiments employs one or two recording disk arrangement, the number of the recording disks to be loaded is not limitative. The taper configuration, size, material, etc. of the screw will be altered depending on the design requirements. The shape and material of the hub may also be changed if desired.

Figure 5:
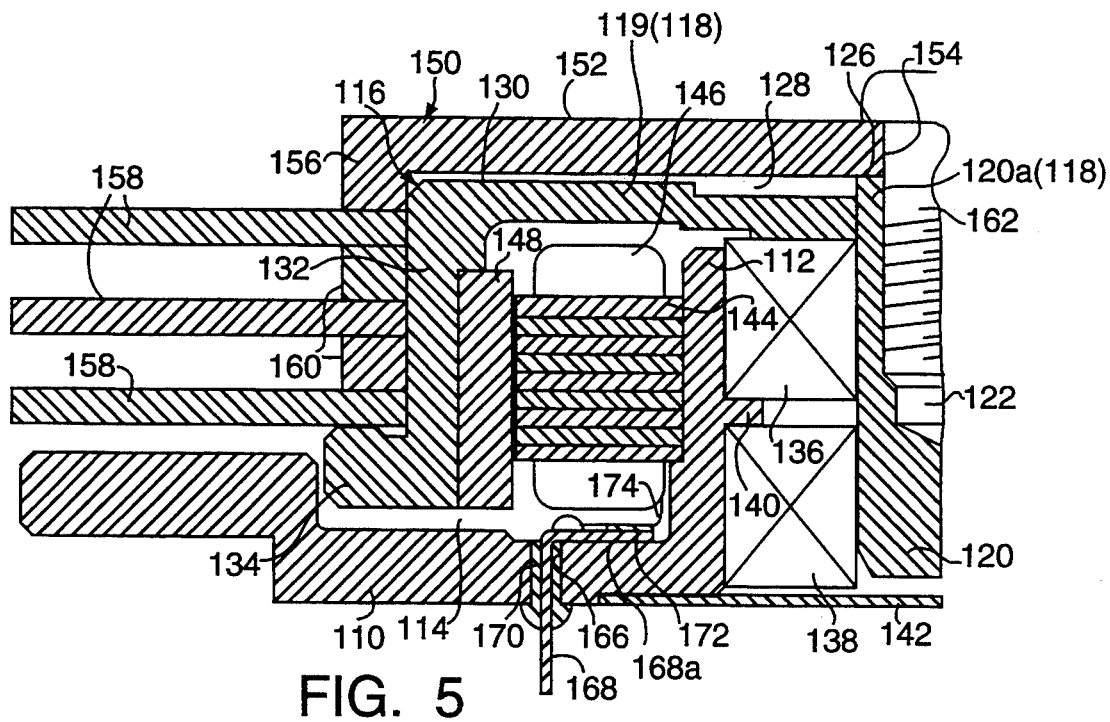
FIG. 5 is a cross sectional view of the half of a recording medium drive apparatus showing a further embodiment of the present invention.
Figure 6:
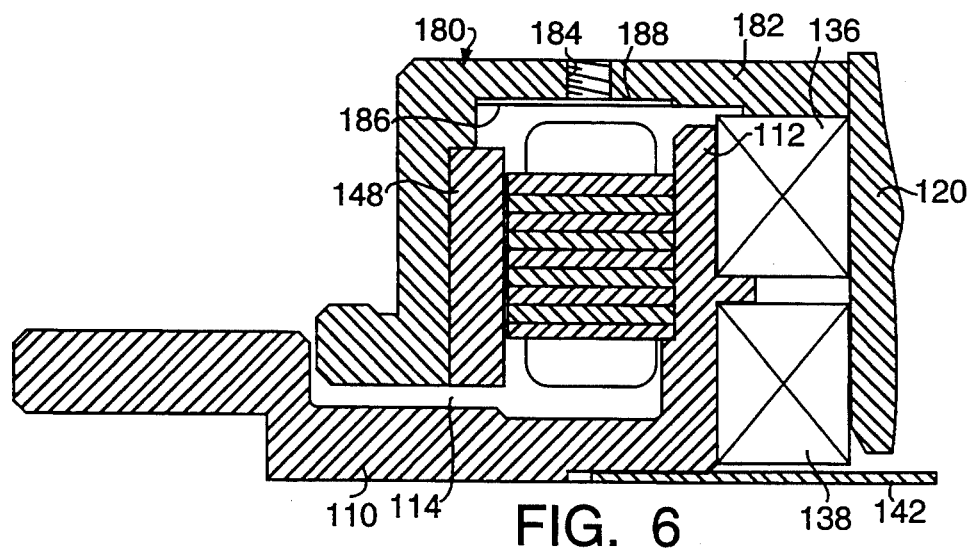
FIG. 6 is a cross sectional view of the half of another recording medium drive apparatus showing a still further embodiment of the present invention.

FIGS. 5 and 6 illustrate other embodiments of the present invention in the form of recording medium drive apparatuses.

Denoted by 110 in FIG. 5 is a bracket. The bracket 110 has a cylindrical bearing holder 112 arranged in the center thereof and extending vertically. There is an annular bracket recess 114 formed in the bracket 110 about the proximal end of the bearing holder 112.

A rotor hub 116 is formed of a pan-like shape. The rotor hub 116 has at top a circular plate 119 arranged flush with the proximal end 120a of a rotary shaft 120 which is fixedly fitted into the center opening of the circular plate 119 to extend downward from the rotor hub 116, as shown in FIG. 5. The circular plate 119 and the proximal end 120a of the rotary shaft 120 constitute a support 118. The rotary shaft 120 has a screw bore 122 provided in the center thereof which is open at the uppermost end. The support 118 has at top center a small-diameter surface 126 which is identical in the diameter to the rotary shaft 120 and extends about the screw bore 122. The circular plate 119 of the rotor hub 116 has an annular recess 128 in the center thereof which is slightly smaller in the outside diameter than the bearing holder 112 and extends about the small-diameter surface 126. The circular plate 119 has a large-diameter surface 130 thereof extending about the annular recess 128. As understood, both the small-diameter 126 and the large-diameter surface 130 are substantially at a right angle to the rotating axis. The rotor hub 116 also has an end rim 132 thereof and an annular projection 134 arranged extending outwardly from the lowermost of the end rim 132.

The rotary shaft 120 is rotatably mounted to the bracket 110 by two, upper and lower, ball bearings 136,138 fitted to the inner side of the bearing holder 112. The bearing holder 112 has an inward projection 140 provided on the inner side thereof. The inward projection 140 is situated between the two ball bearings 136,138 thus serving as a spacer. The lower opening of the bearing holder 112 is airtightly closed with a seal member 142.

There are stator core 144 fixedly mounted to the outer side of the bearing holder 112 and stator coils 146 wound on the stator core 144.

Also, a rotor magnet 148 of a tubular shape is fixedly mounted to the inner side of the end rim 132 of the rotor hub 116 so that it comes opposite to the stator core 144 at a minimal radial distance.

Denote by 150 is a clamp which comprises a circular plate 152 having at center a center opening 154 and an annular downward projection 156 provided on the circumference of the circular plate 152. The outward projection 134 extending from the end rim 132 of the rotor hub 116 carries at upper surface three recording mediums or hard disks 158 which are spaced from each other by annular spacers 160 and located about the outer side of the end rim 132. The clamp 150 is tightened against the rotor hub 116 with a screw 162 threading through the center opening 154 into the screw bore 122 of the shaft member 120. Accordingly, the three disks 158 and the annular spacers 160 are fixedly interposed between the downward projection 156 of the clamp 150 and the outward projection 134 of the rotor hub 116. The screw 162 and the screw bore 122 are selected from a variety of known fastening means.

In clamping with screw 162, the circular plate 152 of the clamp 150 remains, at the region around the its center opening 154, in direct contact with the small-diameter surface 125 of the shaft member 120 while another region of the same which faces the annular recess 128 of the circular plate 152 of the rotor hub 116 is spaced from the rotor hub 116. Even if the tightening of the clamp 150 to the shaft member 120 with the screw 162 causes the circular plate 152 of the clamp 150 to be deflected upwards from the rotor hub 116 with its leftmost end being lifted as shown in FIG. 5, the presence of the annular recess 128 discourages the deflection of the clamp 150 from the rotor hub 116. As the result, the pressing force of the clamp 150 against the hard disks 158 will be preserved thus ensuring no movement of the three disks 158.

The annular recess 128 may be formed in the lower surface of the clamp 150 or in either the rotor hub 116 and the clamp 150. The recess 128 in the rotor hub 116 is advantageous as applicable as a relief surface in insertion of the shaft member 120 into the center hole of the rotor hub 116 so that any injury to the upper surface of the circular plate 119 of the rotor hub 116 can be avoided. Also, the recess 128 in the rotor hub 116 may be used for holding a rotation stopper means in loading of the hard disks 158 onto the rotor hub 116.

The bracket 110 has at bottom an outlet slot 166 through which a flexible pc board 168 coupled at one end to the upper surface of a bottom recess 114 in the bracket 110 is extended downwardly to the outside. The space between the flexible pc board 168 and the inner wall of the outlet slot 166 is filled up with a filler agent 170. Denoted by 172 is a double-sided adhesive tape which is bonded at one side to the inward end 168a of the flexible pc board 168 fixedly placed on the upper surface of the bottom recess 114 of the bracket 110. The adhesive tape 172 may be replaced with an adhesive being applied directly to the inward end 168a of the flexible pc board 168. A lead cable 174 from the stator coils 144 is soldered to its corresponding terminal of the flexible pc board 168 while being tacked on the same with the adhesive tape 172. The adhesive tape 172 is employed for tack bonding for ease of soldering.

FIG. 6 is a cross sectional view of the half of a recording medium drive apparatus showing a further embodiment of the present invention.

According to this embodiment, the main plate 182 of a rotor hub 180 has a screw hole 184 therein extending in the direction of a rotating axis. The screw hole 184 is used for fastening recording mediums with an appropriate screw.

A seal member 186 is formed of a tab or sheet of a plastic material, e.g. polyethylene terephthalate, or metallic material, e.g. stainless steel or aluminum.

The seal member 186 is coated at upper surface with a thermoset adhesive 188 and thus, bonded to the lower surface of the main plate 118 of the rotor hub 116 by heating the thermoset adhesive 188 so that the screw hole 184 is closed airtightly.

The thermoset adhesive 188 after cured by heating becomes hard thus preventing adhesion of dirt around the screw hole 184. Also, the heating causes the thermoset adhesive 188 to release its volatile components. Accordingly, removal of the dirt and escape of the volatile components from the adhesive 188 after assembling or during operation will no more be involved and contamination in the disk chamber of the recording medium drive apparatus will be avoided.

The other arrangement of the drive apparatus is similar to that shown in FIG. 5.

FIGS. 7 to 10 illustrate an improved spindle motor according to the present invention, in which a rotor is rotatably mounted by two ball bearings to a stator.

Figure 7:
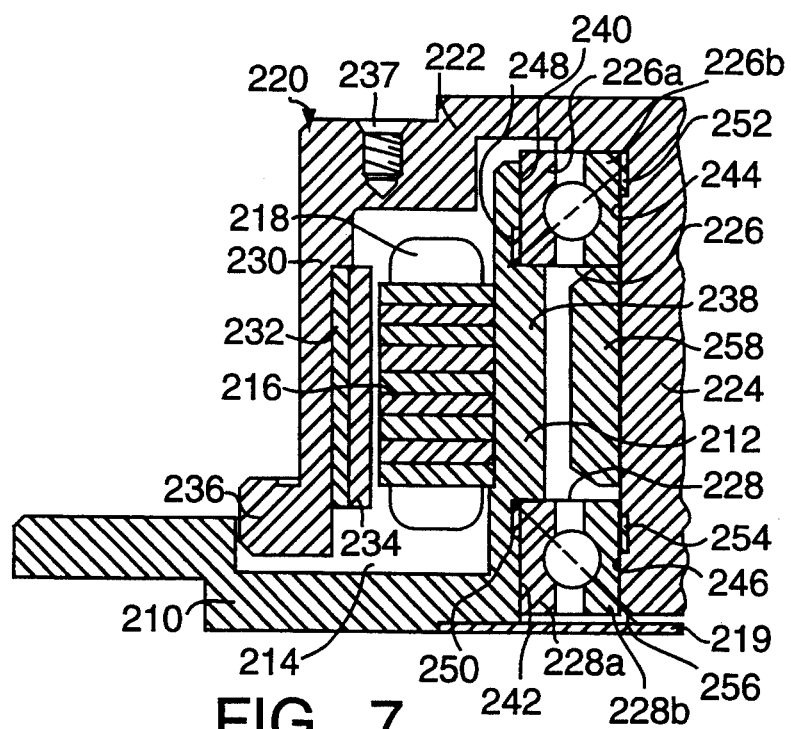
FIG. 7 is a cross sectional view of the half of a spindle motor showing a still further embodiment of the present invention.

As shown in FIG. 7, a stator frame 210 is made of stainless steel and has a cylindrical bearing holder 212 arranged upright in the center thereof. The stator frame 210 has an annular recess 214 provided in the inner surface thereof about the bearing holder 212. A stator core 216 is fitted onto the intermediate of the bearing holder 212 and carries a stator coil 218 wound thereon. The lower opening of the bearing holder 212 is closed with a seal member 219.

A rotor hub 220 is formed of a cup-like shape of aluminum, which comprises a main plate 222 and a rotary shaft 224 extending inward or downward from the center of the main plate 222. The rotary shaft 224 is rotatably supported by two, first and second, ball bearings 226, 228 which are fitted to the inner side of the bearing holder 212. The rotor hub 220 also has at outer edge an end rim 230 which carries at inner side a tubular rotor yoke 232. A tubular rotor magnet 234 is fixedly mounted to the inner side of the rotor yoke 232. The lowermost end of the end rim 230 of the rotor hub 220 is accepted in the annular recess 214 of the stator frame 210 while being spaced a minimal distance from the bottom surface of the recess 214. The end rim 230 has at lowermost a projection 236 for supporting the lower surface of a disk (not shown) which is loaded about the rotor hub 220. The main plate 222 of the rotor hub 220 has a screw hole 237 therein through which a clamp not shown for holding down the disk is fastened with a screw to the rotor hub 220.

The bearing holder 212 has an inward projection 238 provided in the inner side thereof between the first and second ball bearings 226, 228. There are provided two outer race mounting surfaces 240 and 242 on both the upper and lower sides of the inward projection 238 of the bearing holder 212 respectively. Also two inner race mounting surfaces 244 and 246 are provided on the upper and lower ends of the rotary shaft 224 of the rotor hub 220.

More specifically, the outer race 226a of the first ball bearing 226 is bonded by adhesive to the outer race mounting surface 240 with its lower side sustained directly by the upper side of the inward projection 238 of the bearing holder 212 while the inner race 226b of the same is bonded to the inner race mounting surface 244 of the rotary shaft 224 with its upper side sustained directly by the lower side of the main plate 222 of the rotor hub 220. The outer race 228a of the second ball bearing 228 is bonded by adhesive to the outer race mounting surface 242 with its upper side sustained directly by the lower side of the inward projection 238 while the inner race 228b of the same is bonded to the inner race mounting surface 246.

During the bonding procedure before curing of the adhesive, the assembly is pressed by a given pressure from the opposite sides, the upper surface of the main plate 222 of the rotor hub 220 and the lower surface of the inner race 228b of the second ball bearing 228. As the result, the first and second ball bearings 226,228 are installed so that tensions in the directions denoted by their respective one-dot chain lines of FIG. 7 remain exerted between the outer and inner races 226a,226b of the first ball bearing 226 and between the outer and inner races 228a,228b of the second ball bearing 228.

There are four adhesive grooves 248, 250, 252, and 254 provided in the two, upper and lower, outer race mounting surfaces 240,242 of the bearing holder 212 and the two, upper and lower, inner race mounting surfaces 244,246 of the rotary shaft 224 respectively, each groove extending throughout the circumference. The rotary shaft 224 is beveled off (or tapered) at the lowermost end thus producing a bevel cutout 256. The adhesive grooves 248,250,252, 254 can hold an amount of the adhesive for enhancement in the bonding strength. Preferably, the adhesive grooves 248, 250,252,254 and the bevel cutout 256 are arranged continuous in the circumferential direction.

The directions of the tensions on the two ball bearings 226,228 extend across the adhesive grooves 248,250, 252 and the bevel cutout 256, whereby counter stresses on the outer and inner races 240,242,244,246 will be not concentrated about the tension directions but dissipated rationally and thus, stress against the bearing holder 212 and the rotary shaft 224 will be lessened.

If each adhesive groove contains no adhesive, it will be acted as a cutout recess.

Figure 8:
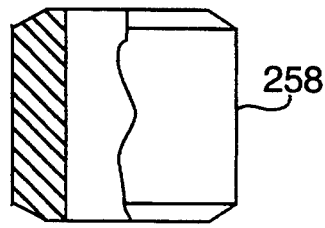
FIG. 8 is a partially cross sectional view of a sleeve of the spindle motor illustrated in FIG. 7.

A sleeve 258 is fixedly fitted onto the rotary shaft 224 between the first and second ball bearings 226,228. FIG. 8 is a partially cross sectional view of the sleeve 258 which is formed of a tubular shape and beveled off at the outer surfaces of both axial ends. The mass and shape of the sleeve 258 are preferably symmetrical about the rotating axis for preventing vibration and uneven rotation. The rotor hub 220, the rotary shaft 224, the rotor yoke 232, the rotor magnet 234, and the sleeve 258 constitute in combination a rotating section of the spindle motor. The stator frame 210 with the bearing holder 212, the stator core 216, and the stator coils 218 constitute a stationary section of the same.

The natural frequency at the rotating section of the spindle motor can be varied by means of the mass and shape of the sleeve 258. The sleeve 258 also provides an extra rigidity on the rotary shaft 224. The sleeve. 258 is fitted onto the rotary shaft 224 between the first and second ball bearings 226,228 so that the rotary shaft 224 is rarely needed to enlarge its diameter. Accordingly, upsizing of the ball bearings 226,228 will be avoided and no change in the shape of the spindle motor will be required.

Figure 9:
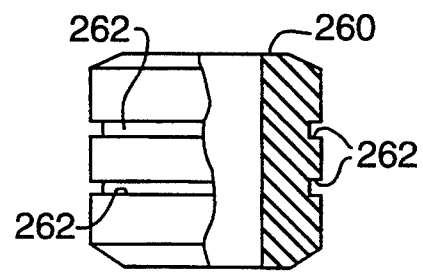
FIG. 9 is a partially cross sectional view of another sleeve for use in the spindle motor illustrated in FIG. 7.
Figure 10:
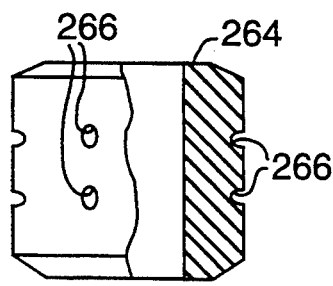
FIG. 10 is a partially cross sectional view of a further sleeve for use in the spindle motor illustrated in FIG. 7.

FIGS. 9 and 10 are partially cross sectional views showing modifications of the sleeve 258.

A modified sleeve 260 shown in FIG. 9 is reduced in the mass by providing annular grooves 262 in the outer surface of the original sleeve 258 shown in FIG. 8. Another sleeve 262 shown in FIG. 10 is slightly reduced in the mass by having a plurality of half-spherical recesses 266 in the outer surface of the sleeve 258 of FIG. 8. The natural frequency of the spindle motor can arbitrarily be varied with the provision of such recesses or grooves of different number, shape, width, depth, etc. in the surface of the sleeve.

What is claimed is:

1. A spindle motor for use in a recording disk drive apparatus comprising a bracket member, a hub member on which at least one recording disk is mounted, a pair of bearings which are interposed between the bracket member and the hub member in a state to which a predetermined axial pressure is applied, each of the bearings having an outer race, an inner race and balls interposed between the outer race and the inner race, the inner race of each of the pair of bearings being fixed to one of the bracket and hub members, and the outer race of each of the pair of bearings being fixed to one of the hub and bracket members:

wherein first annular recesses corresponding to each of the pair of bearings are provided on the bearing fixing surface of the bracket, second annular recesses corresponding to each of the pair of bearings are provided on the bearing fixing surface of the hub member, the first and second recesses corresponding to each of the pair of bearings being arranged to relieve the aforesaid axially applied predetermined pressure acting on the pair of bearings, and the first and second recesses also accommodating an adhesive for fixing the pair of bearings in position.

2. A spindle motor for use in a recording disk drive apparatus according to claim 1, wherein said hub member has at center a rotary shaft thereof where the inner race mounting surfaces are provided so that the two ball bearings can be fitted onto the rotary shaft and also, a sleeve member is fitted onto the rotary shaft between the two ball bearings.

3. A spindle motor for use in a recording disk drive apparatus according to claim 2, wherein said sleeve member has means provided on the periphery thereof for reducing the mass of the same.

4. A spindle motor for use in a recording disk drive apparatus according to claim 3, wherein said means for reducing the mass of the sleeve member are a plurality of grooves.

5. A spindle motor for use in a recording disk drive apparatus according to claim 3, wherein said means for reducing the mass of the sleeve member are a multiplicity of tiny recesses.

* * * * *